United States Patent [19]
Shimoda

[11] Patent Number: 5,306,152
[45] Date of Patent: Apr. 26, 1994

[54] READING APPARATUS FOR EYESIGHT HANDICAPPED PERSON

[75] Inventor: Isamu Shimoda, Zama, Japan

[73] Assignee: Canon Kabushiki Kaisha, Tokyo, Japan

[21] Appl. No.: 962,827

[22] Filed: Oct. 19, 1992

[30] Foreign Application Priority Data

Oct. 30, 1991 [JP] Japan .................................. 3-284745
Nov. 26, 1991 [JP] Japan .................................. 3-310661

[51] Int. Cl.⁵ ........................ G09B 21/00; G06K 9/00
[52] U.S. Cl. .................................... 434/114; 434/116
[58] Field of Search .................... 434/112, 114, 116

[56] References Cited

U.S. PATENT DOCUMENTS

| | | | |
|---|---|---|---|
| 4,793,812 | 12/1988 | Sussman et al. | 434/116 |
| 4,881,900 | 11/1989 | Matsuoka et al. | 434/114 X |
| 4,972,501 | 11/1990 | Horyu | 434/114 X |
| 5,091,865 | 2/1992 | Yamada et al. | 434/114 X |

FOREIGN PATENT DOCUMENTS

| | | |
|---|---|---|
| 0236631 | 9/1987 | European Pat. Off. . |
| 0249920 | 12/1987 | European Pat. Off. . |
| 230102 | 11/1985 | Fed. Rep. of Germany ...... 434/114 |
| 3901023 | 7/1990 | Fed. Rep. of Germany . |
| 2141274 | 12/1984 | United Kingdom . |

OTHER PUBLICATIONS

Systems and Computers in Japan, "A Support System for the Blind to Recognize a Diagram", by Yoshihiro Kawai, et al., Jul. 1990, vol. 21, No. 7, pp. 75-85.
Technische Rundschau, "Interaktive Lesehilfe für Blinde Mit dem Finger lesen", by Urs Müller et al., Aug. 1991, vol. 83, No. 31, pp. 48-51.

*Primary Examiner*—Gene Mancene
*Assistant Examiner*—Cindy A. Cherichetti
*Attorney, Agent, or Firm*—Fitzpatrick, Cella, Harper & Scinto

[57] ABSTRACT

A reading apparatus for a handicapped person includes a reader for optically reading character information from a recording medium and photoelectrically converting the character information so that it is displayed by a pin pattern on a display. When the operator detects a character area from the display result, an area of an object for character recognition is designated by an input unit and the execution of the character recognition is instructed. A processor recognizes the character read by the reader and displays the character so that it can be perceived in a tactile manner. Whether the result of the reading of the character is correct or not can be checked by tactile perception. The recognition result of the character recognized can also be converted into an audio output by an audio output unit.

10 Claims, 6 Drawing Sheets

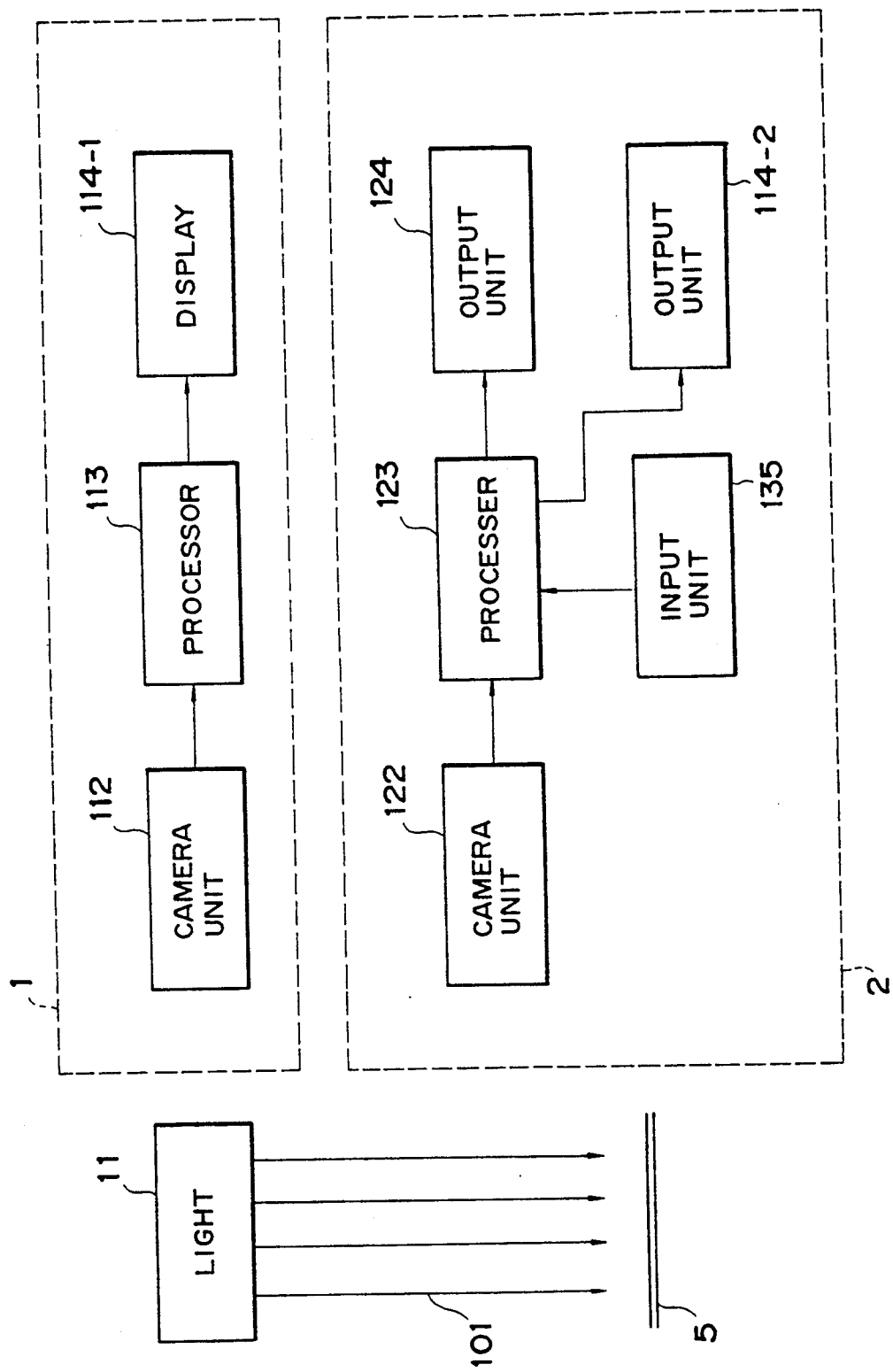

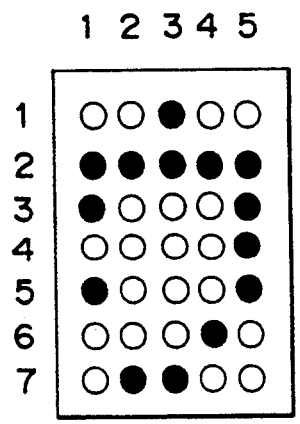
FIG. 2A
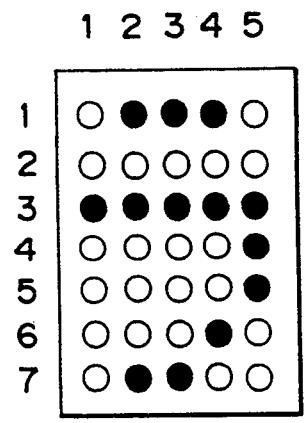
FIG. 2B
FIG. 3
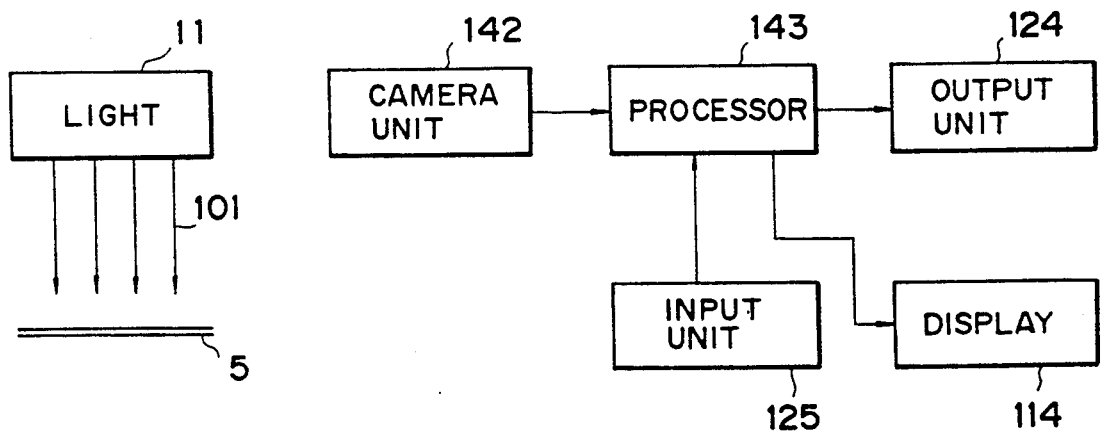

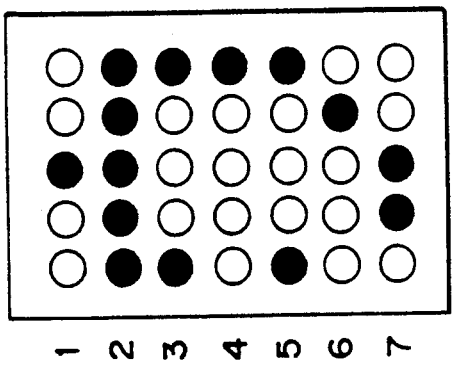
FIG. 9 PRIOR ART
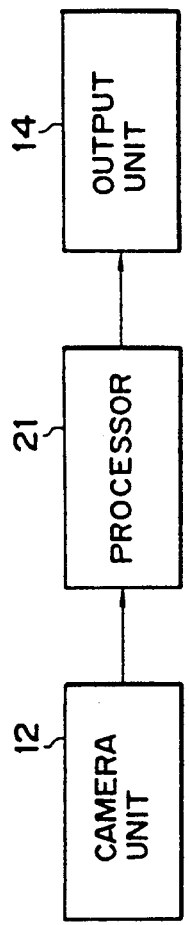
FIG. 10 PRIOR ART
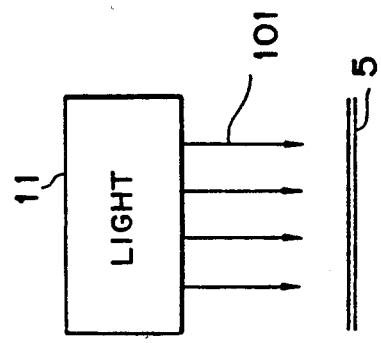

READING APPARATUS FOR EYESIGHT HANDICAPPED PERSON

BACKGROUND OF THE INVENTION

1. Field of the Invention

The invention relates to a reading apparatus for photoelectrically reading character information such as a document or the like and for providing its output to an eyesight handicapped person who confirms the output by tactile perception and, more particularly, to a reading apparatus for an eyesight handicapped apparatus for photoelectrically reading such character information and for converting its output into a vocal output:

2. Related Background Art

According to the research on actual conditions of February, 1987, by the Ministry of Public Welfare in Japan, the number of physically handicapped persons (ages: 18 years and higher) in Japan is equal to 2.40 million. Among them, the number of eyesight handicapped persons is equal to 0.37 million and occupies 12.7%. The number of eyesight handicapped persons who are employed as regular employees is equal to 17,000 in all of Japan and constituted only 5.5% of the entire number of eyesight handicapped persons.

One of the greatest handicaps suffered by the eyesight handicapped the inability to read printed or written characters, namely, what are called ink characters. Communication by characters is an indispensable element of social ink lief.

(1) The first example (OPTACON) of the reading apparatus

This reading apparatus has been realized by Dr. John G. Linvill of Stanford University of U.S.A., and has been commercially available from TSI Co., Ltd. by the name of "OPTACON" since 1971. "Optacon" stands for "OPtical to TActile CONverter (converting apparatus from the optical perception to the tactile perception)". The dimensions of the apparatus are set to a lateral width of 16 cm, a depth of 16 cm, and a height of 4.8 cm, and its weight is 840 grams. The apparatus is portable.

FIG. 8 shows a circuit block diagram of the above reading apparatus. The operation will now be described in accordance with FIG. 8.

A source 11 is constructed by a small electric bulb and a reflecting mirror (not shown). A document 5 is illuminated by an illumination light 101 from the light source 11. A camera unit 12 forms a document image which has been transmitted through a zoom lens (not shown) onto a small silicon photodiode called a silicon retina which functions as a retina of the eye and converts into an electrical signal. An optical magnification can be changed to a value of up to 2.5 times by changing the magnification of the zoom lens.

A processor 20 extracts only the signal representing characters or symbols from the electrical signal and sends it to a display 16. The display is also called a tactile board and has a total of 100 small holes comprising five columns and twenty rows. One pin is enclosed in each hole. When the electrical signal is sent from the processor 20 to the display (tactile board) 16, the head portions of some of the pins are ejected out of the holes and are vertically finely vibrated.

FIG. 9 is a diagram of the display (tactile board) of five columns and seven rows. In the diagram, a black dot (●) indicates a state in which the head portion of the pin is ejected out from the hole to this side. A white dot (○) denotes that the pin is located at the inherent position.

By perceiving the pin pattern (pattern information formed with the pins) by the finger, a character "ウ" can be recognized.

The black dot (●) locating at a position of 5 the fifth row and the first column indicates noise which occurs due to the fouling of the paper surface, the deposition of the ink, or the like. An increase noises makes tactile perception difficult.

In case of a black character written on white paper, the head portions of only the pins corresponding to the black portion are ejected out and are vibrated, thereby propagating substantially the same pattern as that seen by the eyes to the finger. In this manner, the OPTACON can read not only the printed characters but also hand-written characters, a figure, a musical score, or the like, and can also examine a pattern of a cloth material or the like. The characters on the display can be also displayed on the tactile board by accessing a computer.

(2) The second example (OCR) of the reading apparatus

FIG. 10 shows a circuit block diagram of a second example. Its operation will now be described in accordance with FIG. 10.

The light source 11 is constructed by a fluorescent lamp and a reflecting mirror (not shown). The illumination light source 101 from the light 11 illuminates the document 5. The camera unit 12 forms a document image onto a small silicon photodiode array such as a CCD which functions as a retina of the eye and converts into an electrical signal. A processor 21 relates to a portion thereof to convert the electrical signal into a character code. A method of examining a correlation of features of a character or a pattern matching method is used as a converting method. The character code (electrical signal) is extracted and sent to an output unit 14. The output unit 14 generates the character code as electronic information outputted to the outside, thereby converting it into voice signal or braille points. As a reading apparatus of such a type, there is an apparatus only for use in English or an apparatus which can read Kanji (Chinese characters)/ Katakana mixed sentences of Japanese.

The reading apparatus for directly converting a character pattern into a pin pattern as shown in the first example first has the following disadvantages.

1) Since the apparatus depends on tactile perception, the difference between the capabilities of individuals is large.

2) The capability deteriorates due to fatigue.

3) The character pattern is not converted into the character code. Therefore, although patterns other than characters can be read, the ability to connect the apparatus to other information apparatus is poor.

The reading apparatus (OCR type) of the second example has the following disadvantages.

1) In case of a document in which characters and images exist, the recognition ratio is low and it is necessary to extract a character area therefrom. Since the character area is ordinarily extracted by the naked eye, it is necessary to collate it with an original sentence.

2) The collation with the original sentence (confirmation of the character area) cannot be performed by an eyesight handicapped person. Therefore, the help by a normal eyesight person is necessary, thereby causing the self-reliance of the handicapped person to be limited.

SUMMARY OF THE INVENTION

It is, therefore, an object of the invention is to provide a reading apparatus for an eyesight handicapped person in which the character area of an original can be confirmed without a help of a normal eyesight person and the operator can easily grasp the content of a document in consideration of the above points.

Another object of the invention is to provide a reading apparatus in which a signal obtained by optically reading information and converting into an electrical signal is converted into information which can be di7rectly perceived in a tactile manner, and on the other hand, after such a signal is converted into a character code, it is converted into information which can be perceived in a tactile manner. Due to this, whether the above direct conversion should be performed or not can be judged by the information which is obtained after it is converted into the character code.

Another object of the invention is to provide a reading apparatus in which the operator can understand the contents of a document by tactile perception and a vocal output, therefore can easily discriminate masked by characters having much noise or complicated characters. Since the operator can distinguish a character area and a non-character area by the display on display means, only the result of the image pick-up of the character area can be set to an object of the automatic discrimination and the reading time is reduced.

BRIEF DESCRIPTION OF THE DRAWINGS

FIG. 1 is a block diagram showing the first embodiment of the invention;

FIGS. 2A and 2B are diagrams showing display examples of a display of the invention;

FIG. 3 is a block diagram showing the second embodiment of the invention;

FIG. 9 is a diagram showing a pin pattern of a display of the first example of the conventional reading apparatus; and FIG. 10 is a block diagram of the second example of a conventional reading apparatus.

DETAILED DESCRIPTION OF THE pREFERRED EMBODIMENTS

Figure 4:
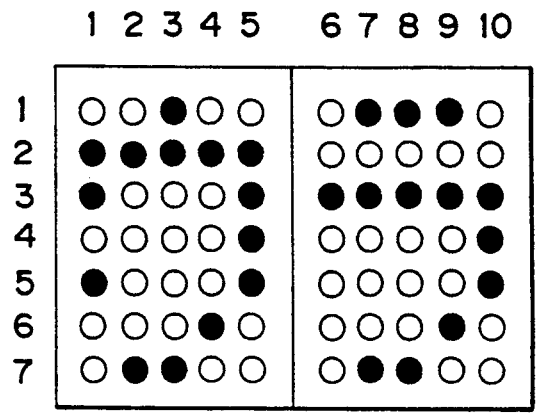
FIG. 4 is a diagram showing pin patterns which simultaneously display two outputs of a processor.

The first embodiment of the invention will be described with reference to a block diagram of FIG. 1. In FIG. 1, the same component elements as those shown and described in FIGS. 8 and 10 are designated by the same reference numerals and have the same functions as those in FIGS. 8 and 10.

Figure 8:
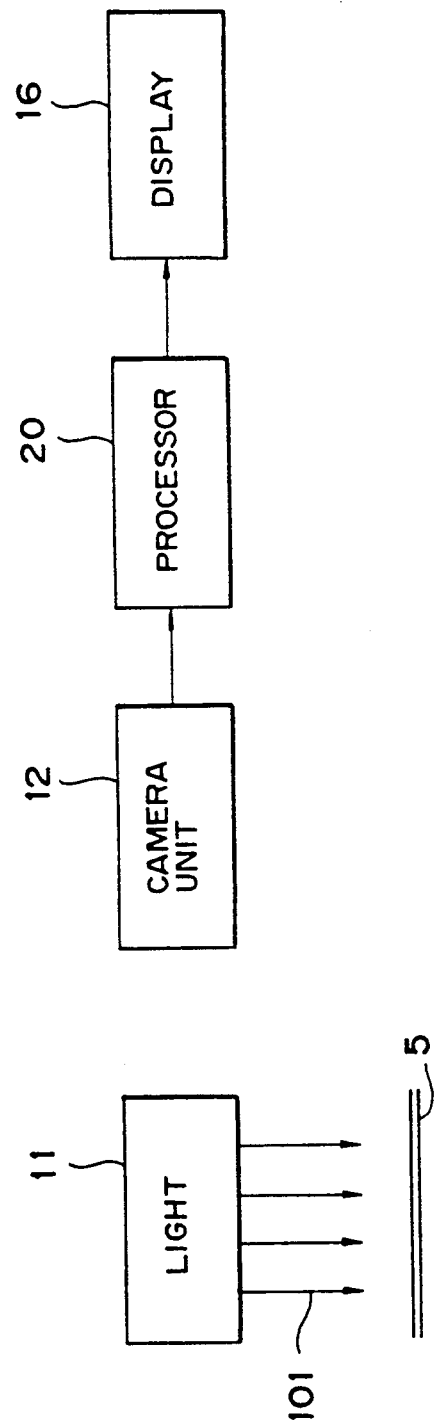
FIG. 8 is a block diagram of the first example of a conventional reading apparatus.

The construction and a function of the light source are fundamentally the same as those of the light source in FIGS. 8 and 10 and it is also constructed by a light source source and a reflecting mirror (not shown). In FIG. 1, the illumination light 101 from the light illuminates the document 5. The reflected light from the document 5 is converted as a character image into the electrical signal by a camera unit 112 of a character confirming apparatus 1 and a camera unit 122 of a character reading apparatus 2.

The character recognizing apparatus 1 is constructed by the camera unit 112, a processor 113, and a display 114-1. The display 114-1 is substantially the same as a display 114 shown in FIG. 3. However, since there are two displays in FIG. 1, they are designated by different numerals to distinguish them.

The character confirming apparatus 1 is substantially the same as that of the first example (FIG. 8) of the conventional example The same pin pattern as that in FIG. 9 is derived on the display 114-1 and is again shown in FIG. 2A.

The noise existing at the location of the fifth row and the first column is also reproduced.

The character reading apparatus 2 is constructed by the camera unit 122, a processor 123, an output unit 124, an input unit 135, and a display 114-2.

The processor 123 has the function of the processor 21 in the second example (FIG. 10) of the conventional example and further has the following functions.

1) The character code is converted into the pin pattern.

2) The character code which has been read by a command from an input unit 135 is substituted for another character code.

3) The character code which has been read after completion of the above substitution is generated.

The pin pattern converted from the character code which has been read by the processor 123 is displayed on the display 114-2. The display 114-2 is the same as the display 114 in the first example (FIG. 8) of the conventional example. FIG. 2B shows the pin pattern on the display 114-2.

By perceiving the pin pattern of FIG. 2A with the finger, a character "フ" (or "u") can be recognized. The pin pattern of FIG. 2B can be recognized as a character "ラ" ("ra"). Since those characters are constructed the pin patterns, they can be recognized even if there is an eyesight disease It is now assumed that two pin patterns are compared and "ラ" is considered to be correct by presuming from the context of the sentence. The substitution of the character code which has been read from the input unit 135 is indicated. When the substitution can be performed, the correct character code is supplied from the same input unit 135. The above procedure is repeated hereinbelow. When the two pin patterns coincide, the processing routine advances to the next character without performing the substitution.

The second embodiment of the invention will now be described with reference to a block diagram of FIG. 3.

Since the light source 11, illumination light source 101, document 5, output unit 124, and input unit 125 are the same as those in the first embodiment, their descriptions are omitted.

A camera unit 142 has the functions of both of the camera units 112 and 122 in the first embodiment, thereby realizing miniaturization of the device and the saving of an electric power consumption.

A processor 143 has the functions of both of the processors 113 and 123 in the first embodiment. Therefore, the processor 143 can generate an output which is obtained by directly converting the electrical output signal of the camera unit 142 into the pin pattern and the output which is obtained by once converting it into the character code and, thereafter, by further converting into the pin pattern. Both of the two outputs are automatically switched by an instruction from the input unit 125 or at predetermined time intervals. Since the confirming operation of the read character due to the comparison of the two pin patterns is substantially the same as that in the first embodiment, its description is omitted.

The two pin patterns obtained from the processor 143, they can be also simultaneously displayed on the display as shown in FIG. 4. In such a case, two pin patterns are displayed by using a display of the ten columns and seven rows of the type in which two displays (tactile boards) each comprising five columns and seven rows are arranged. Due to this, in the comparison of two pin patterns, either one of the switching display mode and the simultaneous display mode, whichever is easier for the operator, can be selected.

The third embodiment of the invention will now be described with reference to a block diagram of FIG. 5.

Since the light source 11, illumination light 101, document 5, camera unit 142, output unit 124, and input unit 125 are the same as those in the second embodiment, their descriptions are omitted.

A processor 153 has the function of the processor 143 of the second embodiment and can further convert the character code into a voice output. Therefore, the processor 153 can generate an output which is obtained by directly converting the electrical output signal of the camera unit 142 into the pin pattern and the voice output. The former output is displayed on the display 114. The latter voice output is supplied to an audio output unit 154. The audio output unit 154 has the function to change the sound volume and has a speaker output and an ear-speaker output. Both of the outputs are selected in accordance with an ambient situation. According to the third embodiment, while listening to the read character by the ears, it is possible to check whether the read character is correct or not by tactile perception. By listening to the sentence with one's ears, the flow of sentence can be understood.

As described above, according to the first to third embodiments of the invention, there are the following advantages 1) to 3).

1) Whether the character information which has been read by the character reading apparatus is correct or not can be checked by the tactile perception, so that even an eyesight handicapped person can read a document by himself.

2) When the character information which has been read by the character reading apparatus is incorrect, it can be corrected. Therefore, even an apparatus of a slightly low character recognition ratio can be used.

3) Whether the character information which has been read by the character reading apparatus is correct or not can be checked by a combination of the auditory sense and tactile perception, so that a reduction of fatigue and the improvement in efficiency can be expected.

The fourth embodiment of the invention will now be described in detail.

Figure 5:
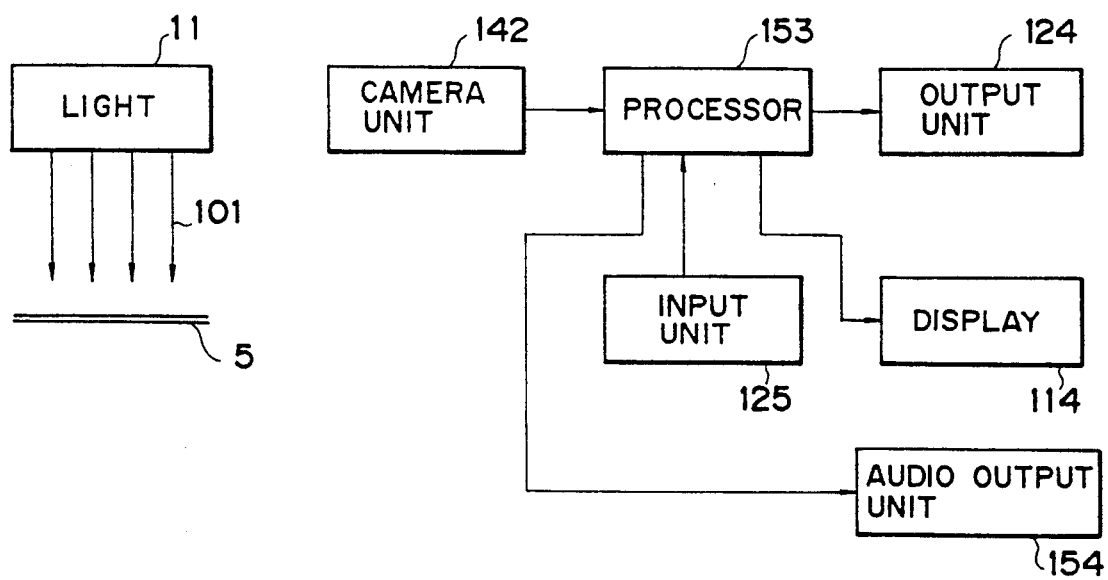
FIG. 5 is a block diagram showing the third embodiment of the invention.

First, in the third embodiment of FIG. 5, the input unit 125 designates the reading start position and the reading end position, thereby instructing the inputting the position of a reading area on the original 5, so that, the image area is considered as an object for a character recognition and for the execution of the character recognition. Consequently, from the image data of one pickup picture plane which has been read by the camera unit 142, the processor 153 extracts the image data of the area designated by the input unit 125 and recognizes the character of the extracted image data. The result of the character recognition is supplied to the audio output unit 154 and the output unit 124 in a format of the character code signal.

The read character image in a format of the pin pattern is also supplied to the display 114.

Figure 6:
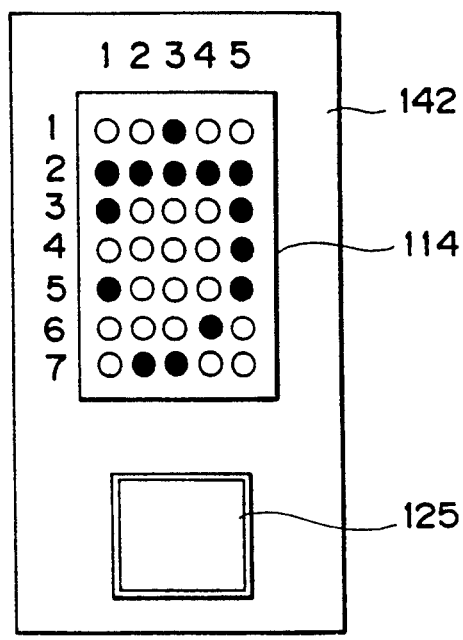
FIG. 6 is a front view showing a front external view of the fourth embodiment of the invention.
Figure 7:
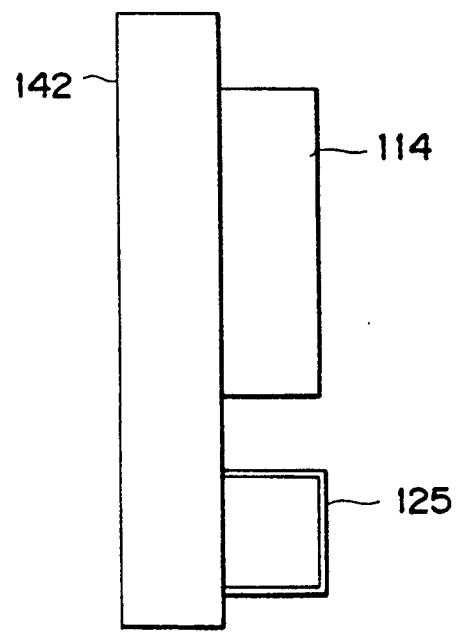
FIG. 7 is a side elevational view showing a side elevational external view of the fourth embodiment of the invention.

A reading apparatus having such a circuit is shown as a fourth embodiment in FIGS. 6 and 7. FIG. 6 shows a front external view of the reading apparatus of the fourth embodiment. FIG. 7 shows a side elevational external view of the reading apparatus of the fourth embodiment.

As shown in FIGS. 6 and 7, the camera unit 142, input unit 125, and display 114 are integratedly constructed and the other constructing portions are enclosed in the camera unit 142.

The operator executes the reading scan of the original 5 while moving the camera unit 142 on the original 5. The processor 153 creates a pin pattern as shown in FIG. 6 from the read character image, thereby allowing the pin pattern to be formed on the display 114.

The operator senses the pin pattern by tactile perception and discriminates whether the camera unit 142 is at present located in the character area in the document or in, for example, a blank area other than the characters. The character image itself is also discriminated.

For instance, when the operator respectively detects the left upper edge position and the right lower edge position of the character area on the original by the display 114, he operates a push button of the input unit 125, thereby setting a reading area regarding a character image as a recognition object. In this instance, the execution of the character recognition about the set reading area has also been instructed. Therefore, the input unit 125 functions as instructing means of the invention.

The read image which has been read for such a period of time is stored in a memory in the processor 153. After the reading area was designated, the processor 153 converts the character pattern which has been read by the movement scan of the camera unit 142 into the character code and supplies to the output unit 124. Since the above operations are similar to those in the conventional example 2 in FIG. 10, their descriptions are omitted.

An eyesight handicapped person cannot directly confirm the character code. Therefore, it is more important to convert the character code into a voice signal and to generate it. For this purpose, the processor 153 converts the character pattern into the character code and also converts it into a voice signal and supplies it to the audio output unit 154 as discriminating means of the invention. The audio output unit 154 has the function to change the sound volume and has a speaker output and an ear-speaker output. The user selects either proper one of the output forms in accordance with an ambient situation or by an instruction of the input unit 125.

As mentioned above, whether a reading area is a correct character area or not is checked by tactile perception and the sentence is heard by the ears, so that the flow of sentence can be understood. Even an eyesight handicapped person can read the ink character document in a manner similar to a normal eyesight person. In addition, by also using the display 114, the operator can grasp the document content by both of the voice output and the character of the pin pattern which is sensed by tactile perception.

Therefore, even when the pin pattern shown by the display 114 is difficult to be recognized as a character due to an influence by noises, by referring to the voice output, the content indicated by the pin pattern can be judged. In the case where the pin pattern and the voice output are quite different, the occurrence of an abnormality in the reading apparatus can be determined.

In addition to the above embodiments, the following other examples can be realized.

(1) In the case where the camera unit 142 has an image pickup area corresponding to a plurality of characters, it is desirable to display the image of the area corresponding to the size of one character of the head of the image pickup area on the display 114.

(2) It is also possible to provide the blank area discriminating function to the processor 153. In this case, image pickup data of the camera unit 142 is binarized into black/white data and, when the number of black pixels counted is equal to or less than a predetermined number, the pin pattern on the display 114 is set to a special pattern, thereby making it possible to inform the operator of the fact that the present image pickup position is the blank area.

As described above, according to the fourth embodiment of the invention, since the operator can understand the document content by both of the tactile perception and the voice, a character associated with noise or complicated character can be easily discriminated. The operator can distinguish the character area and the non-character area by the display of the display means, so that only the result of the image pickup of the character area can be set to an object for the automatic discrimination and the reading time is reduced.

What is claimed is:

1. A reading apparatus for an eyesight handicapped person, comprising:
   reading means for optically reading character information from a recording medium on which the character information has been recorded and for converting the read character information into an electrical signal;
   first converting means for converting the electrical signal from said reading means into information which can be perceived in a tactile manner;
   second converting means for converting the electrical signal from said reading means into coded information and, thereafter, for further converting the coded information into corresponding information which can be perceived in a tactile manner; and
   display means for displaying the information generated from said first and second converting means so that it can be perceived in a tactile manner.

2. An apparatus according to claim 1, wherein said reading means comprises independent first and second reading means, wherein said first converting means receives the electrical signal from said first reading means, and said second converting means receives the electrical signal from said second reading means.

3. An apparatus according to claim 1, wherein said display means performs one of simultaneously displaying the information from said first and second converting means and switching between the information from said first and second converting means and displaying either one of the information.

4. An apparatus according to claim 1, wherein said display means has means for generating the information from said second converting means by audio information.

5. A reading apparatus comprising:
   first and second reading means for optically reading character information from a recording medium on which the character information has been recorded and for converting the read character information into electrical signals;
   first converting means for converting the electrical signal from said first reading means into pixel information which can be perceived in a tactile manner;
   second converting means for converting the electrical signal from said second reading means into a character code and, thereafter, for converting the character code into pixel information which can be perceived in a tactile manner;
   first display means for displaying the information generated from said first converting means in a tactile manner; and
   second display means for displaying the information generated from said second converting means in a tactile manner.

6. An apparatus according to claim 5, wherein said first and second display means perform one of simultaneously displaying the information from said first and second converting means and switching between the information from aid first and second converting means and displaying either one of the information.

7. An apparatus according to claim 5, wherein said second converting means has input means for changing the character code after completion of the conversion.

8. An apparatus according to claim 5, wherein said second display means has converting for generating the information from said second converting means by audio information.

9. A reading apparatus for an eyesight handicapped person, comprising:
   image pickup means for picking up an original image;
   first converting means for converting the electrical signal from said image pickup means into information which can be perceived in a tactile manner;
   second converting means for converting the electrical signal from said image pickup means into coded information and, thereafter, for further converting the coded information into corresponding information which can be perceived in a tactile manner; and
   display means for displaying the information generated from said first and second converting means so that it can be perceived in a tactile manner;
   instructing means for instructing the execution of a character recognition operation for the result of the picking up of the original image by said image pickup means;
   discriminating means for discriminating and recognizing the result of the picking up of the original image by said image pickup means in accordance with an instruction from said instructing means; and
   audio output means for generating the result of the character recognition by said discriminating means in a format of an audio output.

10. An apparatus according to claim 9, wherein said audio output means comprises a speaker and an earspeaker.

* * * * *

UNITED STATES PATENT AND TRADEMARK OFFICE
CERTIFICATE OF CORRECTION

PATENT NO. : 5,306,152
DATED : April 26, 1994
INVENTOR(S) : ISAMU SHIMODA

It is certified that error appears in the above-indentified patent and that said Letters Patent is hereby corrected as shown below:

COLUMN 1

Line 12, "apparatus" (second occurrence) should read -- person --.
Line 14, "output:" should read -- output. --
Line 27, "handicapped" should read -- handicapped persons is --.
Line 30, "ink lief." should read -- life. --

COLUMN 2

Line 9, "increase noises" should read -- increase in noise --.
Line 48, "first" should be deleted.

COLUMN 3

Line 5, "is" (second occurrence) should be deleted.
Line 14, "di 7" should read -- di - --.
Line 25, "output," should read -- output, and --, and "discriminate" should read -- discriminate characters --.
Line 26, "characters having" should be deleted.
Line 57, "pREFERRED" should read -- PREFERRED --.
Line 68, "source" (second occurrence) should be deleted.

UNITED STATES PATENT AND TRADEMARK OFFICE
CERTIFICATE OF CORRECTION

PATENT NO. : 5,306,152
DATED : April 26, 1994
INVENTOR(S) : ISAMU SHIMODA

Page 2 of 2

It is certified that error appears in the above-indentified patent and that said Letters Patent is hereby corrected as shown below:

COLUMN 4

Line 15, "example" should read -- example. --.
    Line 42, "constructed" should read -- constructed by --.
    Line 44, "disease" should read -- disease. --.

COLUMN 7

Line 28, "embodi7" should read --embodi- --.

COLUMN 8

Line 29, "aid" should read -- said --.
    Line 35, "converting" should read -- converting means --.

Signed and Sealed this

Sixth Day of September, 1994

Attest:

BRUCE LEHMAN

*Attesting Officer*     *Commissioner of Patents and Trademarks*